United States Patent [19]

Jones

[11] Patent Number: 5,400,088
[45] Date of Patent: Mar. 21, 1995

[54] APPARATUS, METHODS AND MATERIAL FOR ABSORBING MAGNETIC RADIATION

[76] Inventor: Billy D. Jones, 1231 Richardson Ave., Los Altos, Calif. 94024

[21] Appl. No.: 632,148

[22] Filed: Dec. 21, 1990

[51] Int. Cl.⁶ ............................................. H04N 5/65
[52] U.S. Cl. ....................................... 348/819; 315/8; 315/85; 313/313; 174/35 MS; 174/35 R; 361/816
[58] Field of Search ........................ 358/245, 247, 255; 315/8, 85; 313/313, 402, 479; 250/515.1; 174/35 MS, 35 R; 361/816, 817, 818; 348/819, 818, 820, 829, 830, 831, 842

[56] References Cited

U.S. PATENT DOCUMENTS 2,860,328 11/1958 Langworthy ........................ 358/245
4,556,821 12/1985 Cooper .................................. 358/245
4,980,564 12/1990 Steelman .......................... 174/35 MS

*Primary Examiner*—Curtis Kontz
*Assistant Examiner*—Ping W. Lee
*Attorney, Agent, or Firm*—Roland I. Griffin

[57] ABSTRACT

Hook- and-loop-type tapes are selectively attached to a video display unit and to flexible elongated strips of magnetic material so that the strips of magnetic material may be removably mounted around the video display unit in orthogonally intersecting planes to absorb magnetic radiation from the source. Each strip of magnetic material has a grain orientation parallel to its longitudinal axis and may be formed from grain-oriented ferromagnetic material in the range from M3 to M7. A multiple-layer magnetic shielding material is provided by securing first and second layers of such grain-oriented ferromagnetic material together with the grain orientation of the first layer orthogonal to the grain orientation of the second layer. Each strip of magnetic material may also be formed from this multiple-layer magnetic shielding material.

22 Claims, 6 Drawing Sheets

APPARATUS, METHODS AND MATERIAL FOR ABSORBING MAGNETIC RADIATION

BACKGROUND AND SUMMARY OF THE INVENTION

This invention relates generally to apparatus, methods and materials for absorbing magnetic radiation such as that produced by video display units and more specifically to apparatus that may be mounted on video display units of different shapes and sizes to absorb such radiation.

There has been a growing concern about the health hazards related to prolonged exposure to ELF (extremely low frequency) magnetic radiation produced by video display units such as computer terminals, monitors, television sets and the like. See, for example, the article entitled "The Risk of Miscarriage and Birth Defects Among Women Who Use Visual Display Terminals During Pregnancy" in the Jun., 1988 issue of the American Journal of Industrial Medicine; the book entitled "Currents of Death" authored by Paul Brodeur and published in 1989 by Simon & Schuster; the article entitled "EPA Suspects ELF Fields Can Cause Cancer" in the Jun. 30, 1990 issue of Science News; the article entitled "The Magnetic Field Menace" in the Jul., 1990 issue of MacWorld; and the article entitled "Danger From a Glowing Screen" in the Jul. 18, 1990 issue of Time Magazine. Since the use of video display units has become so widespread and so continuous from day to day both in the workplace and the home, the health hazards related to prolonged exposure to ELF magnetic radiation must be taken seriously. Thus, anything that can be done now to reduce those health hazards both in connection with the video display units currently in use and in connection with the manufacture of new video display units is extremely important.

Accordingly, the purpose of this invention is to provide methods and means for reducing the operators' and others' exposure to ELF magnetic radiation such as that produced by video display units. This purpose is achieved in accordance with one of the illustrated preferred embodiments of this invention by providing a kit including a plurality of elongated flexible elements or strips of magnetic material and both hook- and loop-type tape for removably mounting the strips of magnetic material on a video display unit around the back from one side to the other and over the top from one side to the other in orthogonally intersecting planes. Each strip of magnetic material has a grain orientation parallel to its longitudinal axis and is formed from ferromagnetic material in the range from M3 to M7. The strips of magnetic material absorb magnetic radiation produced by the video display unit, thereby reducing the user's exposure to ELF magnetic radiation without interfering with the viewing of the display of the video display unit and without hampering the air flow for cooling the video display unit. By selectively attaching the hook- and loop-type tape to the strips of magnetic material and to the video display unit itself, the strips of magnetic material may be easily mounted and positioned on the video display unit and may be just as easily removed and subsequently remounted as might be necessary for packing and transporting the video display unit or for any other purpose.

In accordance with another of the illustrated preferred embodiments of this invention, there is provided a multiple-layer magnetic shielding material comprising first and second layers of grain-oriented ferromagnetic material in the range from M3 to M7. These layers are bonded or otherwise secured together with the grain orientation of the first layer orthogonal to the grain orientation of the second layer. This grain-oriented multiple-layer magnetic shielding material is much less costly than conventional non-grain-oriented magnetic shielding materials, such as Mu-metal, and is of comparable efficiency. The strips of magnetic material to be mounted on the video display unit, as described above, may therefore also be formed from this grain-oriented multiple-layer magnetic shielding material without unduly increasing the cost of the strips of magnetic material and, hence, of the kit for absorbing magnetic radiation produced by the video display unit.

DESCRIPTION OF THE PREFERRED EMBODIMENTS

Figure 1A:
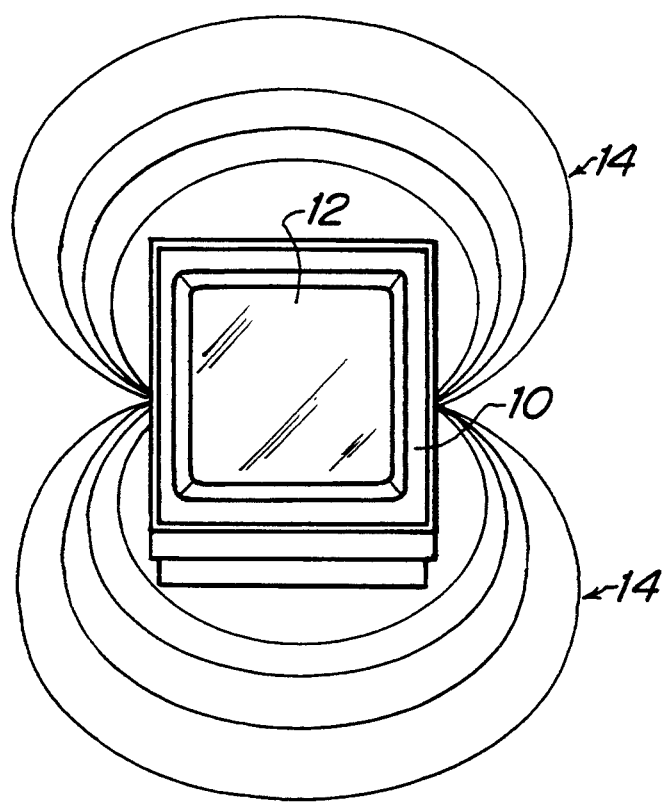
FIGS. 1A and 1B are front and top views, respectively, of a video display unit showing the ELF (extremely low frequency) magnetic radiation emanating from the video display unit in orthogonal planes.
Figure 1B:
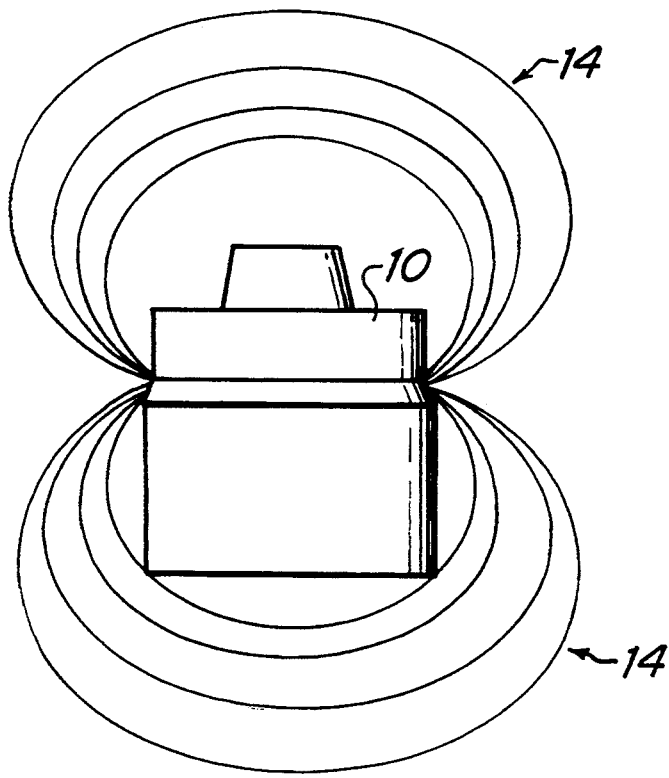

Referring to FIGS. 1A and 1B, there is shown a video display unit 10, such as a computer terminal of a type commonly used with an input control unit (which may or may not be integral with the video display unit) for word processing, data storage and retrieval, and other such information processing operations. Such a terminal is commonly referred to as a VDT (video display terminal). The video display unit 10 typically has a viewing screen 12 for an operator's use in viewing information and typically is positioned on a desk, table or the like directly in front of the operator. While usually seated within very close proximity (within one or two feet) of the video display unit 10, the operator manipulates a keyboard or some other input control unit, such as a mouse, to control the operations performed and information displayed by the video display unit. Conventional video display units 10 produce ELF magnetic radiation as indicated by the magnetic field lines 14 shown emanating from the video display unit in the vertical plane of FIG. 1A and in the orthogonal horizontal plane of FIG. 1B. As indicated by the articles listed in the foregoing background and summary, there is a growing concern about the health hazards related to prolonged exposure to such magnetic radiation.

Figure 2:
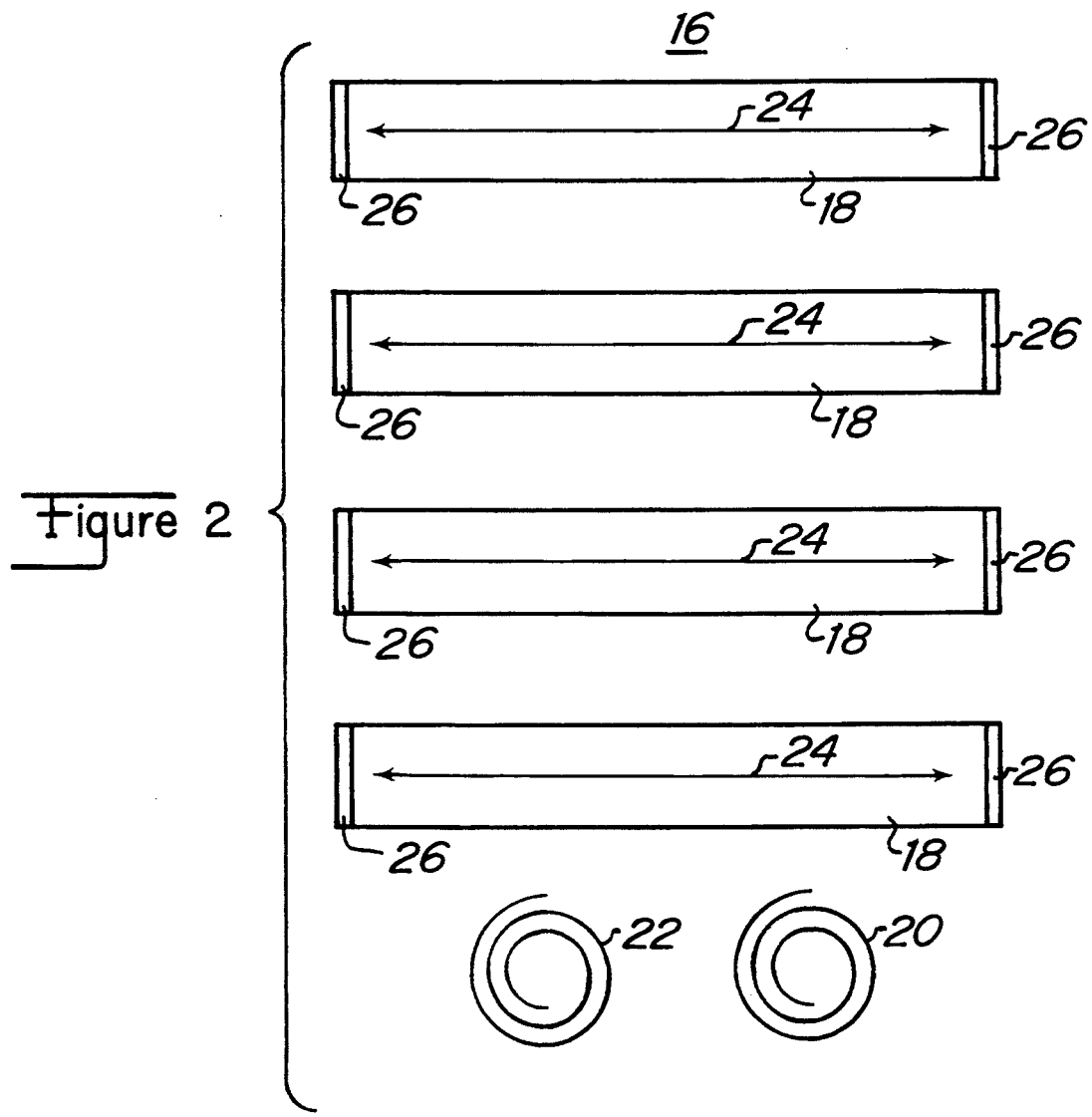
FIG. 2 shows a kit, including flexible elongated strips of magnetic material and both hook- and loop-type tape, that may be employed to absorb magnetic radiation from a video display unit.

Referring to FIG. 2, there is shown a kit 16 that may be easily employed with video display units 10 currently in use or in connection with the manufacture of new video display units to absorb magnetic radiation produced by video display units and thereby reduce the health hazards associated with exposure to such radiation. The kit 16 includes a plurality of flexible elongated elements or strips 18 of magnetic material, hook-type tape 20 and loop-type tape 22.

Four flexible strips 18 of magnetic material are employed to allow for easily accommodating video display units 10 of different shapes and sizes with a minimum of parts. Each strip 18 may be formed of a non-grain-oriented high-permeability magnetic shielding material, such as Mu-metal. However, due to the current high cost of such non-grain-oriented magnetic shielding material and the discovery that comparable results can be achieved by properly employing much less expensive grain-oriented magnetic material, each strip 18 is formed from grain-oriented ferromagnetic material in the range from M3 to M7, such as is currently produced for use in making transformers. This enables the strips 18 of magnetic material to be made much less expensively and, hence, the kit 16 to be priced more affordably and therefore put into use more quickly and universally.

Each strip 18 of magnetic material is formed with the grain (or domain) orientation of the material parallel to the longitudinal axis of the strip, as indicated by the double-headed arrows 24. A plastic end cap 26 is press fitted on or bonded to each end of each strip 18 of magnetic material to enhance the appearance of each strip and to protect against cutting oneself on an end of a strip.

Figure 3:
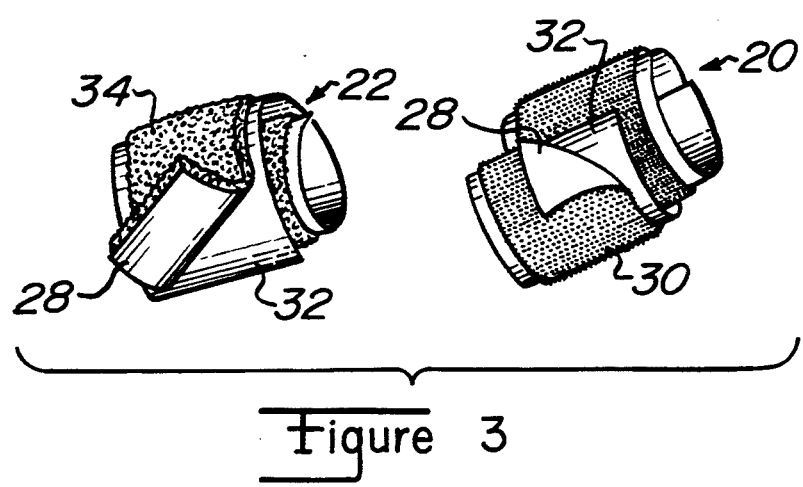
FIG. 3 shows the hook- and loop-type tape of FIG. 2 in greater detail.

As best shown in FIG. 3, the hook-type tape 20 has an adhesive layer 28 with a hook-type material 30 bonded to its front side and a paper backing 32 removably attached to its back side. Similarly, the loop-type tape 22 has an adhesive layer 28 with a loop-type material 34 bonded to its front side and a paper backing 32 removably attached to its back side. The hook- and loop-type tape 20 and 22 may comprise, for example, Velcro hook and loop tape. Pieces of the hook- and loop-type tape 20 and 22 are cut to size and attached at selected positions to the strips 18 of magnetic material and to the video display unit 10 so that the strips of magnetic material may be mounted around the video display unit in intersecting planes. This is accomplished by removing the paper backing 32 from the pieces of hook- and loop-type tape 20 and 22 once they are cut to size and by applying the back side of the adhesive layer 28 of the pieces of hook- and loop-type tape to the strips 18 of magnetic material and the video display unit 10 at the selected positions.

Figure 4:
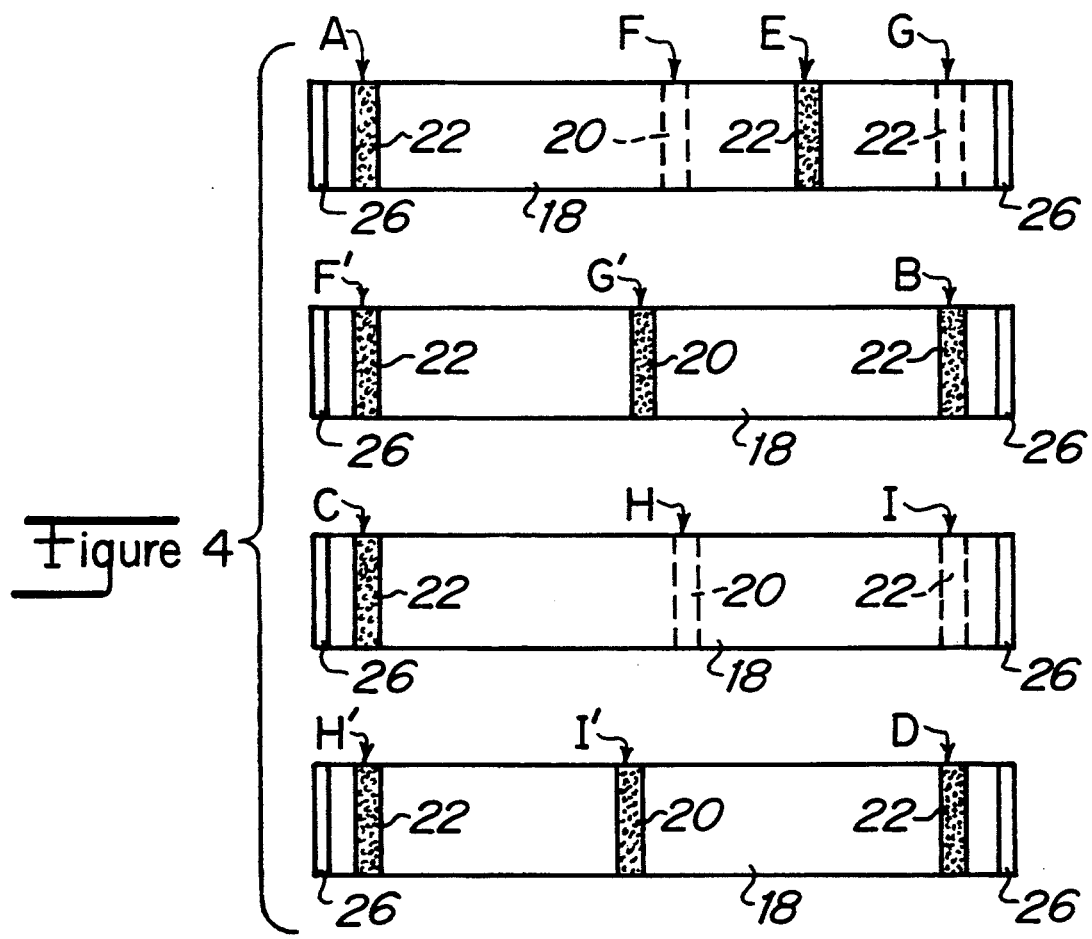
FIG. 4 shows the strips of magnetic material of FIG. 2 with the hook- and loop-type tape selectively attached thereto for mounting the strips of magnetic material on a video display unit.
Figures 5A, 5B:
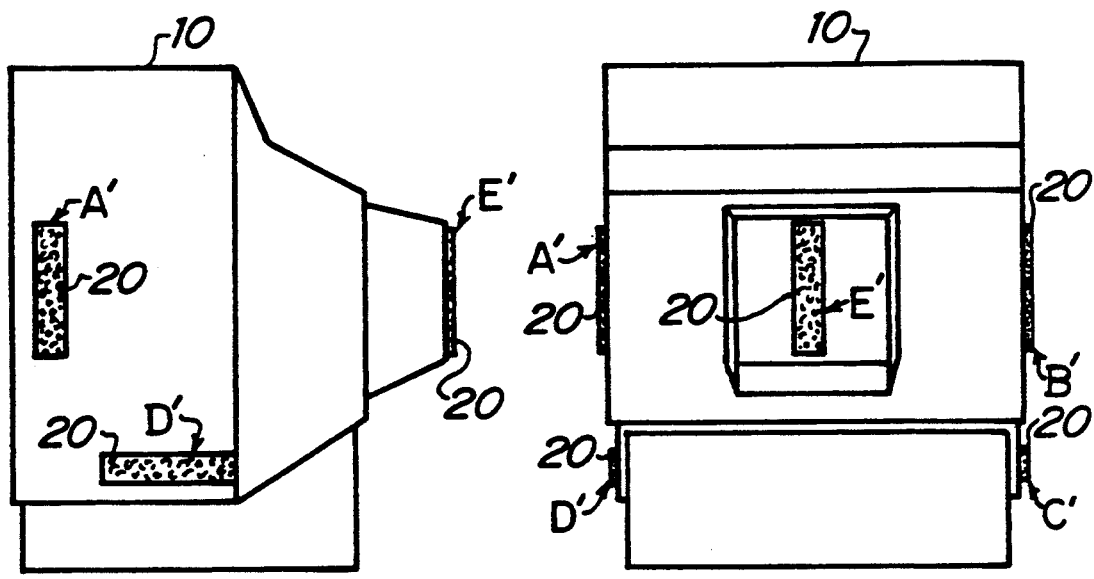
FIGS. 5A and 5B are side and rear views, respectively, of a video display unit with hook-type tape selectively attached thereto for mounting the strips of magnetic material of FIG. 4 on the video display unit.

As shown, for example, in FIGS. 4, 5A and 5B, pieces A–D of loop-type tape 22 for mounting the strips 18 of magnetic material on the video display unit 10 are attached to the strips 18 as follows: piece A is attached to the first (uppermost) strip 18 adjacent to the left-hand end cap 26; piece B is attached to the second (from the top) strip 18 adjacent to the right-hand end cap 26; piece C is attached to the third (from the top) strip 18 adjacent to the left-hand end cap 26; and piece D is attached to the fourth (lowermost) strip 18 adjacent to the right-hand end cap 26. The pieces A–D of loop-type tape 22 are all positioned on the same side of their respective strips 18 of magnetic material and are disposed for engagement with corresponding pieces A'–D' of hook-type tape 20 attached to the video display unit 10 as follows: pieces A' and B' are generally centrally attached to the opposite sides of the video display unit towards the front thereof; and pieces C' and D' are generally centrally attached to the opposite sides of the video display unit towards the bottom thereof. A piece E of loop-type tape 22 is also attached to the first strip 18 of magnetic material on the same side as the piece A and is disposed for engagement with a corresponding piece E' of hook-type tape 20 generally centrally attached to the back of the video display unit 10.

Figure 6:
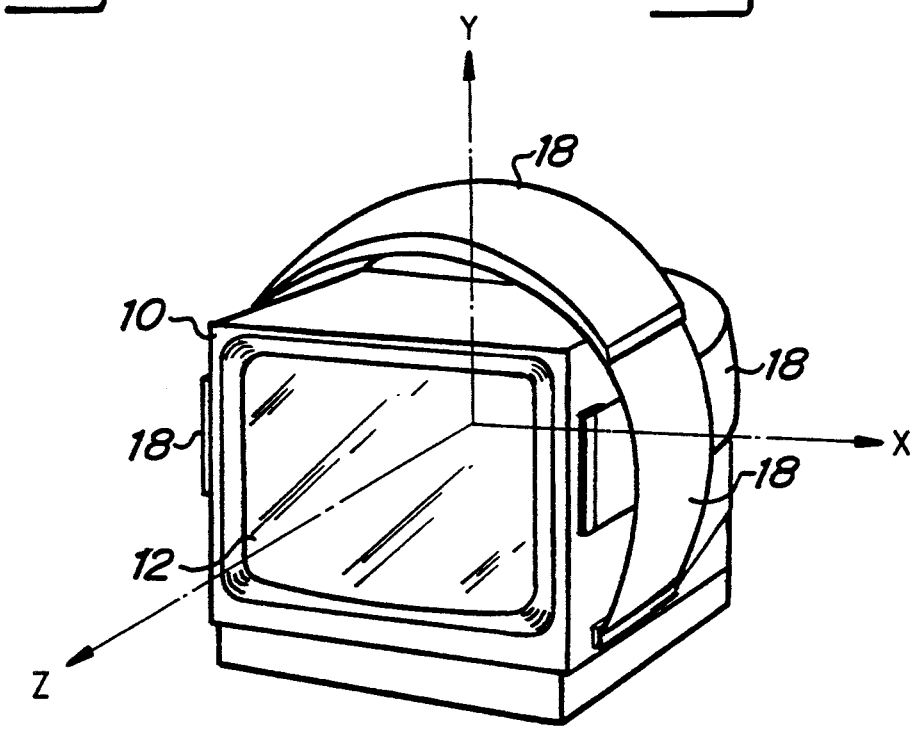
FIG. 6 is a perspective view of the video display unit of FIGS. 4, 5A and 5B with the strips of magnetic material of FIGS. 2 and 4 mounted thereon.

The first and second strips 18 of magnetic material are joined together so as to pass around the back of the video display unit 10 from one side to the other, as shown in FIG. 6. This may be accomplished by attaching a piece F of hook-type tape 20 and a piece G of loop-type tape 22 to the first strip 18 of magnetic material on the opposite side from the pieces A and E of loop-type tape 22 with the piece F positioned in an intermediate region of the first strip and with the piece G positioned adjacent to the right-hand end cap 26 of the first strip. A corresponding piece F' of loop-type tape 22 and a corresponding piece G' of hook-type tape 20 are attached to the second strip 18 of magnetic material on the same side as the piece B of loop-type tape 22 with the piece F' positioned adjacent to the left-hand end cap 26 of the second strip and with the piece G' positioned in an intermediate region of the second strip. The piece F of hook-type tape 20 and the piece G of loop-type tape 22 are disposed on the first strip 18 of magnetic material for engagement with the corresponding piece F' of loop-type tape 22 and the corresponding piece G' of hook-type tape 20 disposed on the second strip 18 of magnetic material to join the first and second strips together.

Similarly, the third and fourth strips 18 of magnetic material are joined together so as to pass over the top of the video display unit 10 from one side to the other, as shown in FIG. 6. This may be accomplished by attaching a piece H of hook-type tape 20 and a piece I of loop-type tape 22 to the third strip 18 of magnetic material on the opposite side from the piece C of loop-type tape 22 with the piece H positioned in an intermediate region of the third strip and with the piece I positioned adjacent to the right-hand end cap 26 of the third strip. A corresponding piece H' of loop-type tape 122 and a corresponding piece I' of hook-type tape 20 are attached to the fourth strip 18 of magnetic material on the same side as the piece D of loop-type tape 22 with the piece H' positioned adjacent to the left-hand end cap 26 of the fourth strip and with the piece I' positioned in an intermediate region of the fourth strip. The piece H of hook-type tape 20 and the piece I of loop-type tape 22 are disposed on the third strip 18 of magnetic material for engagement with the corresponding piece H' of loop-type tape 22 and the corresponding piece I' of hook-type tape 20 disposed on the fourth strip 18 of magnetic material to join the third and fourth strips together.

Figure 7A:
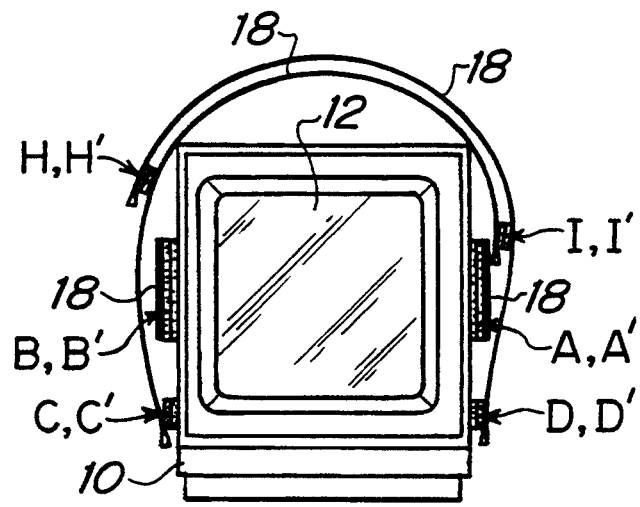
FIGS. 7A and 7B are front and top views, respectively, of the video display unit of FIGS. 4, 5A and 5B with the strips of magnetic material of FIGS. 2 and 4 mounted thereon.
Figure 7B:
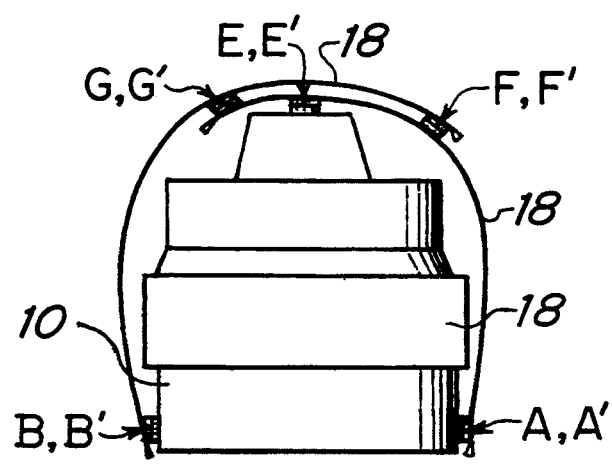

The overall length of the joined first and second strips 18 of magnetic material is determined by the placement of the pieces F and G of hook- and loop-type tape 20 and 22 on the first strip and by the placement of the corresponding pieces F' and G' of loop- and hook-type tape 22 and 20 on the second strip. As shown in FIGS. 6, 7A and 7B, the overall length of the joined first and second strips 18 of magnetic material is selected so that the joined first and second strips pass around the video display unit 10 from one side to the other with the piece A of loop-type tape 22 on the first strip engaged with the piece A' of hook-type tape 20 on one side of the video display unit, with the piece B' of loop-type tape on the second strip engaged with the piece B' of hook-type tape on the opposite side of the video display unit, and with the piece E of loop-type tape on the first strip engaged with the piece E' of hook-type tape on the back of the video display unit. Similarly, the overall length of the joined third and fourth strips 18 of magnetic material is determined by the placement of the pieces H and I of hook- and loop-type tape 20 and 22 on the third strip and by the placement of the corresponding pieces H' and I' of loop- and hook-type tape 22 and 20 on the fourth strip. As shown in FIGS. 6, 7A and 7B, the overall length of the joined third and fourth strips 18 of magnetic material is selected so that the joined third and fourth strips pass over the top of the video display unit 10 from one side to the other with the piece C of loop-type tape 22 on the third strip engaged with the piece C' of hook-type tape 20 on one side of the video display unit, and with the piece D of loop-type tape on the fourth strip engaged with the piece D' of hook-type tape on the opposite side of the video display unit.

Figure 8:
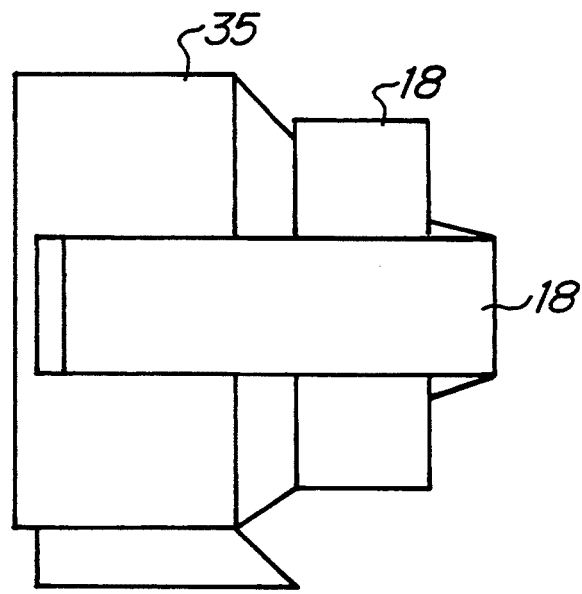
FIG. 8 is a side view of another video display unit with strips of magnetic material mounted thereon.
Figure 9:
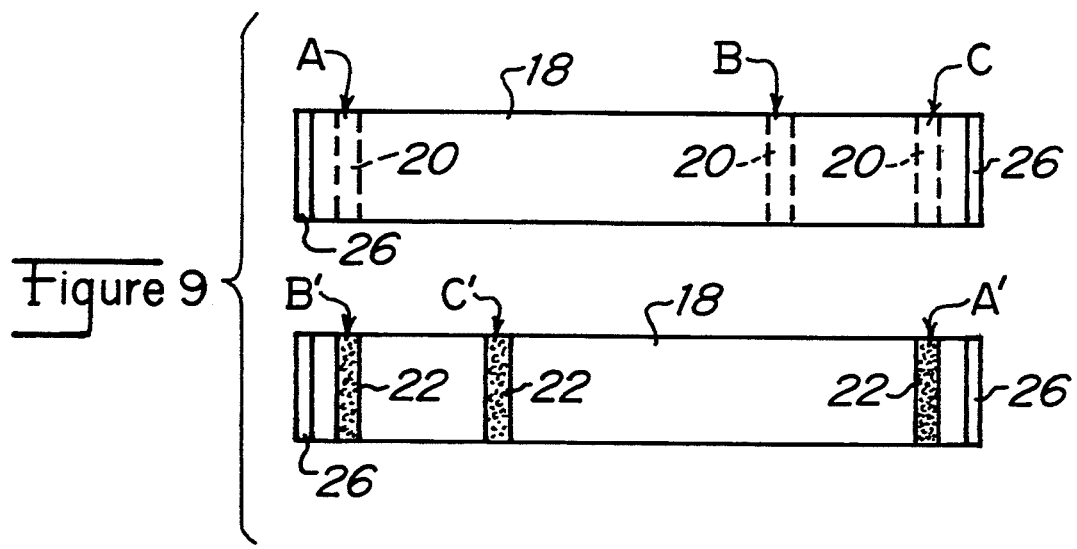
FIG. 9 shows strips of magnetic material with the hook- and loop-type tape selectively attached thereto for mounting those strips of magnetic material around the back portion of the video display unit of FIG. 8.

From the foregoing, it may be seen that the overall length of the joined first and second strips 18 of magnetic material and of the joined third and fourth strips 18 of magnetic material may be adjusted as necessary to accommodate video display units 10 of different shapes and sizes. For example, in the case of a pedestal-type video display unit 35, such as that shown in FIG. 8, the joined first and second strips 18 of magnetic material may be mounted on the video display unit so as to pass around the back of the video display unit from one side to the other as previously described. However, the joined third and fourth strips 18 of magnetic material may be mounted on the video display unit 35 so as to entirely encircle the back portion of the video display unit. This may be accomplished, as shown in FIG. 9, by attaching pieces A-C of hook-type tape 20 to one side of the third strip 18 of magnetic material with the pieces A and C respectively positioned adjacent to the left- and right-hand end caps 26 of the third strip and with the piece B positioned in an intermediate region of the third strip. Corresponding pieces A'-C' of loop-type tape 22 are attached to the opposite side of the fourth strip 18 of magnetic material with the pieces A' and B' respectively positioned adjacent to the right- and left-hand end caps 26 of the fourth strip and with the piece C' positioned in an intermediate region of the fourth strip.

The pieces A-C of hook-type tape 22 on the third strip 18 of magnetic material and the corresponding pieces A'-C' on the fourth strip 18 of magnetic material are disposed so that the third and fourth strips may be joined together by engagement of the pieces B and C of hook-type tape 20 with the corresponding pieces B' and C' of loop-type tape 22. The joined third and fourth strips 18 of magnetic material may thereupon be mounted entirely around the back portion of the video display unit 35 by engagement of the piece A of hook-type tape 20 on the third strip with the corresponding piece A' of loop-type tape 22 on the fourth strip. If necessary, other pieces of hook-type tape 20 may be attached to the joined third and fourth strips 18 of magnetic material for engagement with corresponding pieces of loop-type tape 22 that may be attached either to the video display unit 35 or to adjacent portions of the joined first and second strips 18 of magnetic material.

In every case the joined first and second strips 18 of magnetic material are mounted on the video display unit 10 or 35 in a plane intersecting the plane in which the joined third and fourth strips 18 of magnetic material are mounted on the video display unit. For best results these planes should intersect at an angle within the range from 70° to 110° and preferably should be orthogonal to one another, as shown in FIGS. 6, 7A, 7B and 8. Significant reductions in the magnetic radiation emanating from a video display unit 10 or 35 have been achieved by mounting the strips 18 of magnetic material on the video display unit in orthogonally intersecting planes as described above. This is indicated by TABLES I–IV below, where the magnetic radiation emanating from a video display unit 10 or 35 is given in milligauss (mG) as first measured without the strips 18 of magnetic material mounted on the video display unit (the "unshielded" case) and as subsequently measured with the strips 18 mounted on the video display unit as shown in FIGS. 6, 7A and 7B (the "shielded" case). In these tables the "percent" the magnetic radiation is reduced by employing the strips 18 of magnetic material is given by the ratio of the measured magnetic radiation for the unshielded case to the measured magnetic radiation for the shielded case.

The following TABLE I provides the results as measured both twelve inches and twenty-four inches from the viewing screen 12 of the video display unit 10 or 35 along an axis orthogonally passing through the center of the viewing screen:

TABLE I

| Front | 12 in. | 24 in. |
| --- | --- | --- |
| Unshielded | 4.44 mG | 1.00 mG |
| Shielded | 2.00 mG | 0.42 mG |
| Percent | 222% | 238% |

The following TABLE II provides the results as measured both twelve inches and twenty-four inches from the viewing screen 12 of the video display unit 10 or 35 along an axis intersecting the center of the viewing screen at an angle of forty five degrees below the axis orthogonally passing through the center of the viewing screen:

TABLE II

| Front (45) | 12 in. | 24 in. |
| --- | --- | --- |
| Unshielded | 3.9 mG | 1.00 mG |
| Shielded | 1.4 mG | 0.38 mG |
| Percent | 279% | 263% |

The following TABLE III provides the results as measured both twelve inches and twenty-four inches from one side of the video display unit 10 or 35 along an axis orthogonally passing through the side of the video display unit midway between the top and bottom of viewing screen 12:

TABLE III

| Side | 12 in. | 24 in. |
| --- | --- | --- |
| Unshielded | 11.59 mG | 2.44 mG |
| Shielded | 3.75 mG | 0.88 mG |
| Percent | 309% | 277% |

The following TABLE IV provides the results as measured both twelve inches and twenty-four inches from the back end of the video display unit 10 or 35 along the axis orthogonally passing through the center of the viewing screen 12 of the video display unit:

TABLE IV

| Back | 12 in. | 24 in. |
| --- | --- | --- |
| Unshielded | 6.35 mG | 1.35 mG |
| Shielded | 1.80 mG | 0.41 mG |
| Percent | 353% | 329% |

From the foregoing tables, it may be seen that the strips 18 of magnetic material effectively absorb magnetic radiation produced by video display unit 10 or 35 and thereby significantly reduce the operator's and others' exposure to harmful ELF magnetic radiation. As shown in FIGS. 6, 7A, 7B and 8, this is achieved without blocking or otherwise interfering with the operator's full view of the viewing screen 12 of the video display unit 10 or 35 and without hampering the air flow for cooling the video display unit. By employing pieces of hook- and loop-type tape 20 and 22 to mount the strips 18 of magnetic material on the video display unit 10 or 35 as shown and described herein, the strips 18 may be easily mounted and positioned on the video display unit and may be easily removed for packing and transporting the video display unit or for any other purpose, and may subsequently be just as easily remounted on the video display unit. Moreover, it may be seen that the strips 18 of magnetic material may be mounted on or about other sources of magnetic radiation by employing the hook- and loop-type tape 20 and 22 or some other fastening means.

Figure 10:
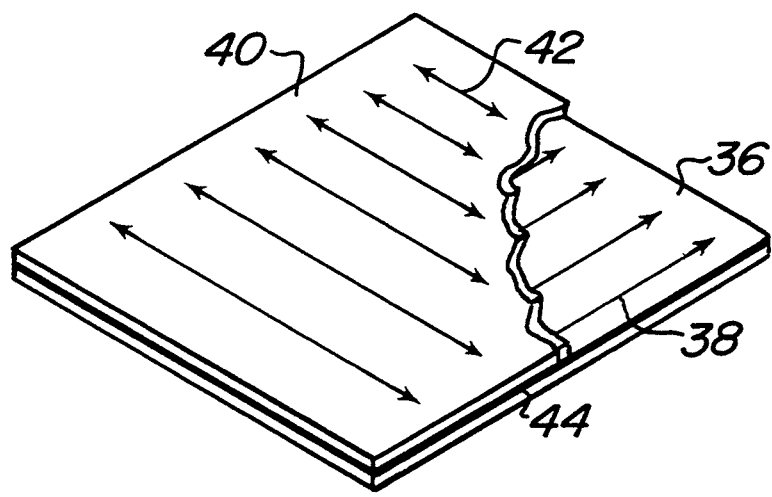
FIG. 10 is a perspective view of a sheet of multiple-layer magnetic shielding material from which the strips of magnetic material of FIGS. 2 and 4 may be formed.

Referring now to FIG. 10, there is shown a multiple-layer magnetic shielding material according to another of the preferred embodiments of the present invention. This magnetic shielding material has a first layer 36 of magnetic material with a grain (or domain) orientation extending in a first direction, as indicated by double-headed arrows 38, and has an adjacent second layer 40 of magnetic material with a grain (or domain) orientation extending in a second direction orthogonal to the first direction, as indicated by double-headed arrows 42. The first and second layers 36 and 40 of magnetic material are bonded together by a rubberized or plastic adhesive 44 or are secured together by spot welding, riveting or any other such technique. Each of the first and second layers 36 and 40 of magnetic material comprises grain-oriented ferromagnetic material preferably in the range from M3 to M7, as described above in connection with FIG. 2.

This multiple-layer magnetic shielding material is much less costly than conventional non-grain-oriented magnetic shielding materials, such as Mu-metal, and yet is of comparable efficiency. The strips 18 of magnetic material described above in connection with FIGS. 2, 4 and 6-9 may be made of this multiple-layer magnetic shielding material by forming each strip with its longitudinal axis parallel to the grain orientation of either the first layer 36 or the second layer 40 of the multiple-layer magnetic shielding material. There are many other uses for this multiple-layer magnetic shielding material besides providing shielding for video display units such as computer terminals and television sets. For example, it can be used to provide magnetic shielding for home appliances, such as toasters or the like, or to provide magnetic shielding for classrooms, offices or even buildings that might be exposed to ELF magnetic radiation such as that produced by power lines.

I claim:

1. Apparatus for absorbing magnetic radiation emanating from a video display unit, said apparatus comprising:
   a plurality of elements of magnetic material; and
   fastening means for detachably mounting said elements externally around said video display unit with at least one of said elements extending around a back portion of the video display unit from a side portion to another side portion thereof in a first plane passing through the video display unit between a top portion and a bottom portion thereof and with at least another of said elements extending around a top portion of the video display unit in a second plane intersecting the first plane within the video display unit and passing through the video display unit between a front portion and a back portion thereof to absorb magnetic radiation from the video display unit.

2. Apparatus as in claim 1 wherein said video display unit comprises:
   video display means for viewing information; and a housing for containing said video display means.

3. Apparatus as in claim 2 wherein said fastening means is attachable to said housing of said video display unit and to said elements for detachably mounting the elements around the video display unit in said first and second intersecting planes to absorb magnetic radiation from the video display unit.

4. Apparatus as in claim 1 wherein said elements have a selected grain orientation.

5. Apparatus as in claim 4 wherein said elements comprise flexible elongated strips each having a grain orientation parallel to its longitudinal axis.

6. Apparatus as in claim 5 wherein said fastening means is attachable to said video display unit and to said strips for removably mounting at least one of the strips around the video display unit in said first plane and at least another of the strips around the video display unit in said second plane to absorb magnetic radiation from the video display unit.

7. Apparatus as in claim 6 wherein said fastening means comprises tape of a first type and tape of a second type for removably engaging the tape of the first type, said tape of the first and second types being selectively attachable to opposite side portions of said video display unit and to said strips for removably mounting one or more of the strips around a back portion of the video display unit in said first plane and one or more of the strips around a top portion of the video display unit in said second plane to absorb magnetic radiation from the video display unit.

8. Apparatus as in claim 7 wherein said tape of the first type comprises either a hook-type tape or a loop-type tape, and said tape of the second type comprises the other of said hook- and loop-type tapes.

9. Apparatus as in claim 5 wherein said first and second planes intersect at an angle within the range from 70° to 110°.

10. Apparatus as in claim 9 wherein said first and second planes are orthogonal to one another.

11. Apparatus as in claim 10 wherein said strips comprise grain-oriented ferromagnetic material in the range from M3 to M7.

12. Apparatus as in claim 11 wherein said strips comprise four in number.

13. A video display unit comprising:
video display means for viewing information;
a housing for containing said video display means;
at least one magnetic element mounted externally around said housing in a first plane; and
at least one magnetic element mounted externally around said housing in a second plane;
said magnetic elements being disposed in intersecting first and second planes to absorb magnetic radiation from said video display means, said first plane passing through the display means between a top portion and a bottom portion thereof and said second plane intersecting the first plane and passing through the display means between a front portion and a back portion thereof.

14. A video display unit as in claim 13 wherein said elements have a selected grain orientation.

15. A video display unit as in claim 14 wherein said intersecting first and second planes are orthogonal to one another.

16. A video display unit as in claim 15 including fastening means attachable to said housing and said elements for detachably fastening the elements to the housing in said intersecting first and second planes.

17. A video display unit as in claim 14 wherein said elements comprise strips of grain-oriented ferromagnetic material in the range from M3 to M7 with each strip having a grain orientation parallel to its longitudinal axis.

18. A method of absorbing magnetic radiation emanating from a source unit, said method comprising the steps of:
mounting one or more elongated strips of grain-oriented ferromagnetic material in the range from M3 to M7, externally around said source unit in a first plane passing through the source unit between a top portion and a bottom portion thereof; and
mounting one or more elongated strips of grain-oriented ferromagnetic material in the range from M3 to M7, externally around said source unit in a second plane orthogonally intersecting the first plane within the source unit and passing through the source unit between a front portion and a back portion thereof;
said mounting steps including fastening said elongated strips to opposite sides of said source unit in said first and second orthogonally intersecting planes with each strip having a grain orientation parallel to its longitudinal axis to absorb magnetic radiation emanating from the source unit.

19. A video display unit comprising:
video display means for viewing information;
a housing for containing said video display means;
at least one magnetic element mounted externally around said housing in a first plane; and
at least one magnetic element mounted externally around said housing in a second plane;
said magnetic elements being disposed in intersecting first and second planes to absorb magnetic radiation from said video display means, said first plane passing through the display means between a top portion and a bottom portion thereof, and said second plane intersecting the first plane within the housing and passing through the display means between a front portion and a back portion thereof.

20. A video display unit as in claim 19 wherein:
said elements have a selected grain orientation; and
said intersecting first and second planes are orthogonal to one another.

21. A video display unit as in claim 20 including fastening means attachable to said housing and said elements for detachably fastening the elements to the housing in said intersecting first and second planes, 22. A video display unit as in claim 20 wherein said elements comprise strips of grain-oriented ferromagnetic material in the range from M3 to M7with each strip having a grain orientation parallel to its longitudinal axis.

* * * * *